United States Patent [19]

Imoto et al.

[11] Patent Number: 5,186,987
[45] Date of Patent: Feb. 16, 1993

[54] LINING MATERIAL FOR PIPE LINES AND A PROCESS FOR PROVIDING PIPE LINES THEREWITH

[75] Inventors: Takayoshi Imoto, Otsu; Masahiro Seshimo, Nishinomiya; Futoshi Makimoto, Otsu; Eiji Kitagawa, Kyoto, all of Japan

[73] Assignee: Ashimori Industry Co., Ltd., Osaka, Japan

[21] Appl. No.: 617,614

[22] Filed: Nov. 26, 1990

[30] Foreign Application Priority Data

Apr. 10, 1990 [JP] Japan ................................. 2-95881

[51] Int. Cl.⁵ .................... F16L 55/162; F16L 58/04
[52] U.S. Cl. .......................... 428/34.5; 428/34.6; 428/35.4; 428/36.2; 428/246; 428/286; 428/290; 138/98; 138/153; 138/174; 138/128; 264/36; 264/269; 156/287
[58] Field of Search .............. 138/97, 98, 153, 172, 138/174, 128; 264/269, 267, 36; 156/287; 428/361, 362, 63, 246, 281, 286, 288, 290, 34.5, 34.6, 35.2, 35.4

[56] References Cited

U.S. PATENT DOCUMENTS

| | | | |
|---|---|---|---|
| 4,681,783 | 7/1987 | Hyodo | 138/98 |
| 4,686,126 | 8/1987 | Hyodo | 428/36.1 |
| 4,972,880 | 11/1990 | Strand | 138/98 |
| 4,976,290 | 12/1990 | Gelin | 138/98 |
| 4,997,703 | 3/1991 | Gehrig | 428/290 |
| 5,030,493 | 7/1991 | Rich | 428/36.1 |

FOREIGN PATENT DOCUMENTS

| | | |
|---|---|---|
| 51-40595 | 11/1976 | Japan . |
| 58-9317 | 2/1983 | Japan . |
| 2-266917 | 10/1990 | Japan . |
| 1423819 | 1/1972 | United Kingdom . |

Primary Examiner—Ellis P. Robinson
Assistant Examiner—Rena L. Dye
Attorney, Agent, or Firm—Birch, Stewart, Kolasch & Birch

[57] ABSTRACT

A lining material for pipe lines, especially those buried in the ground and a process for providing pipe lines therewith are disclosed, which includes a flexible tubular film, a sheet covering the outer surface of the tubular film and a film capable of being split off covering the outer surface of the sheet, characterized in that the sheet includes a fabric and a mat of fibers of high tenacity impregnated with a thickened liquid thermohardenable resin to form a fabric-fiber-reinforced composite molding sheet having a sufficient length and a width greater than the inner circumferential length of a pipe line to be treated, and that both lateral end portions of the sheet are slidably overlapped with each other to form a tube around the tubular film, the outer circumferential length of the tube being shorter than the inner circumferential length of the pipe line. The present invention is distinguished by using a specific fabric-fiber-reinforced composite molding sheet as the predominant constituent of the lining material in place of the conventional SMC and overcomes all the drawbacks in the prior art. The lining material is particularly suited for lining sewage pipes.

5 Claims, 2 Drawing Sheets

LINING MATERIAL FOR PIPE LINES AND A PROCESS FOR PROVIDING PIPE LINES THEREWITH

BACKGROUND OF THE INVENTION

1. Field of the Invention

The present invention relates to a lining material for pipe lines, chiefly those buried in the ground, such as sewage pipes, which is capable of forming as a lining thereof a strong inner pipe made of fabric-fiber-reinforced plastic for reinforcing the pipe lines and to a process for providing the pipe lines with such fabric-fiber-reinforced plastic lining. More particularly, the present invention relates to a lining material for pipe lines already constructed and buried in the ground, such as gas pipe lines, city water pipe lines and sewage pipes, for the purpose of repair or reinforcement of these pipe lines, which comprises a plastic tubular film overlaid with a specific fabric-fiber mat impregnated with a hardenable resin and an outer film, and to a process for providing the pipe lines with such fabric-fiber-reinforced plastic lining, which comprises inserting the lining material into the pipe lines, applying the lining material onto the inner surface of the pipe lines under internal pressure exerted by a pressurized fluid introduced into the pipe line and curing the resin by heating.

2. Description of the Prior Art

From the past, various lining materials are known for repair or reinforcement of pipe lines. In particular, a lining material comprised of a mat of a fibrous material impregnated with a hardenable resin is known, for example, in Japanese Patent Publn. Nos. Sho. 51-40595 and 58-9317. The lining material disclosed in Japanese Patent Publn. No. Sho. 51-40595 (referred to hereinafter simply as Ref. 1) comprises, as shown in FIGS. 1-5 and 8, a mat or tubular mat of a strong fibrous material such as glass fibers impregnated with a liquid thermohardenable resin being interposed, like a sandwich between an inner tubular plastic film and an outer plastic film. On application of this lining material onto the inner surface of pipe lines, the lining material is introduced into the pipe lines after peeling off the outer plastic film and is inflated so as to be brought into intimate contact with the inner surface of the pipe line, and the thermohardenable resin is cured to form a fiber-reinforced plastic (FRP) lining on the inner surface of the pipe lines. The inner tubular plastic film may be removed by peeling after completion of the FRP lining (Col.12, lines 2-4, Ref. 1).

A mat or tubular mat of a strong fibrous material impregnated with a liquid thermohardenable resin, which is usually interposed between inner and outer plastic films and is heated under a given condition to thicken the liquid resin, is called according to ASTM "Sheet Molding Compound" (referred to hereinafter as SMC). In this case, two plastic films on both sides of the resinimpregnated mat which will form FRP serve to prevent evaporation of the hardenable resin ingredient in the mat, for example, monomeric styrene.

Figure 2:
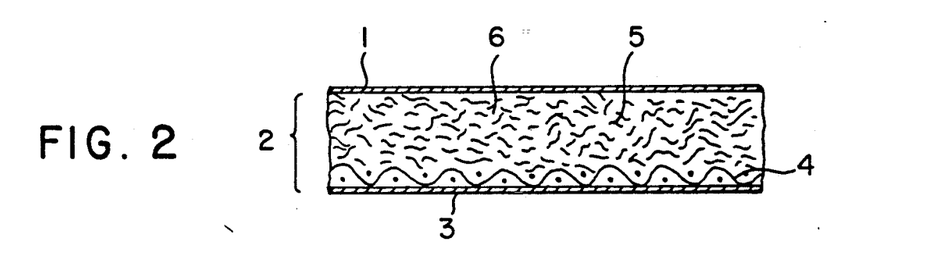
FIG. 2 is a partially enlarged view of the cross section of the lining material shown in FIG. 1 as a circular portion.
Figure 4:
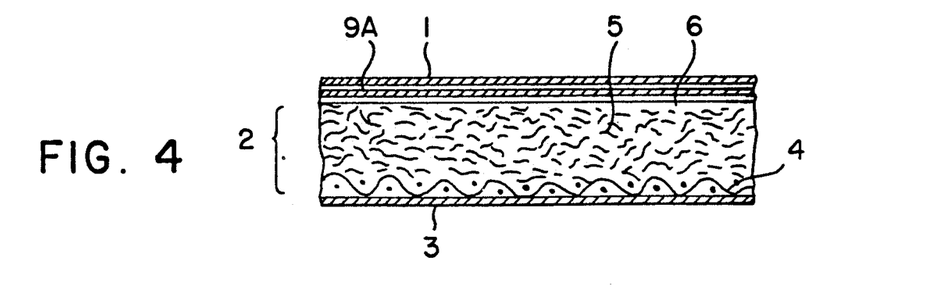
FIG. 4 is a partially enlarged view of the cross section of another example of the lining material wherein the middle film capable of being liquefied with a solvent contained in the thermohardenable resin is interposed between the FCM-sheet and the tubular film.
Figure 5:
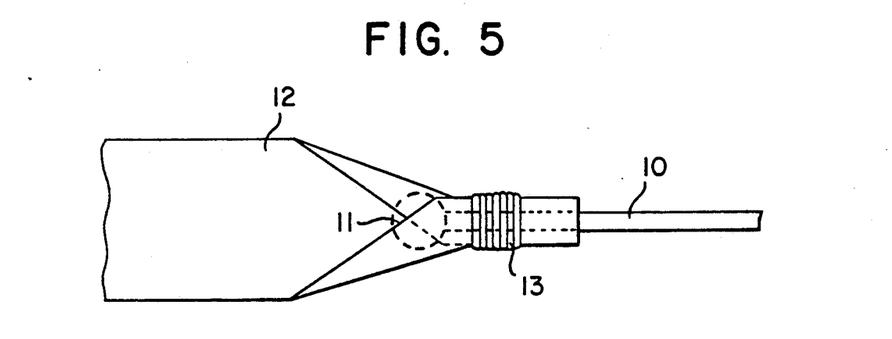
FIG. 5 is a plan view showing a terminal end of the lining material bound to a drawing belt for inserting the lining material into a pipe line.

In the lining material disclosed in Ref. 1, a mat of glass fibers is firstly spread on a plastic film capable of easily being split off and is impregnated with a hardenable resin to form a curable FRP, i.e. FRP not yet cured which is then overlaid with a tubular film as shown in FIG. 2. Both ends of the curable FRP are folded on the tubular film so that it may be wrapped with the curable FRP in such manner that both lateral end portions of the curable FRP are overlapped (FIG. 4). The curable FRP in the form of a tube is then wrapped with the outer plastic film and a composite tube thus obtained is finally heated to thicken the curable FRP whereby a tubular SMC is obtained (FIG. 5).

However, the lining material of Ref. 1 has such a drawback that when it is inserted into the pipe lines, a strong force is exerted to SMC due to frictional resistance against the inner surface of the pipe lines and so the SMC is locally stretched to reduce its thickness or is broken down in the extreme case. In particular, SMC in a not-yet-cured state is poor in tensile strength and easily undergoes deformation.

It is also drawback of SMC that it has no stretchability. Upon application of the the lining material, it is usually so adjusted that its outer circumferential length is approximately identical with the inner circumferential length of the pipe line to be treated. When the lining material inserted into the pipe line is inflated to bring the lining material into intimate contact with the inner surface of the pipe line evenly, however, the whole parts of the outer of the lining material are not always contacted to the correct position of the inner surface of the pipe line even if the lining material is uniformly inflated. The part of the lining material initially contacted with the inner surface of the pipe line is not slidable to the correct position due to frictional resistance so that the lining material may form wrinkles due to distortion and occurrence of locally loose portions. On the other hand, the portion of the lining material not finally attached to the inner surface of the pipe line is strongly elongated so that the weak portion of the lining material tends to be broken down as SMC has no stretchability.

The lining material disclosed in Japanese Patent Publn. No. Sho. 58-9317 (referred to hereinafter as Ref. 2) comprises SMC interposed, like a sandwich structure, between an outer tubular film and a specific inner tubular film having an outer layer capable of being easily split off from SMC and an inner layer having a high moisture-proof property. Ref. 2 discloses as a specific example of the inner tubular film one having an outer layer of polyamide, polyester or a fluorine resin and having an inner layer of polyvinyl chloride, polyester, polyolefin or a fluorine resin, one having an outer layer of polyamide and an inner layer of polyolefin (Col. 2-3, Ref. 2) and particularly one having an outer layer of nylon 6 film and an inner layer of a laminated film of nylon 6 and polyethylene (Table 4).

What is taught by Ref. 1 and Ref. 2 is that SMC is suitable as a material for lining pipe lines and is converted at the final stage to FRP although there are some differences between both in the structure of the inner plastic film. Accordingly, the nature and structure of SMC of these Refs. 1 and 2 applied onto the inner surface of pipe lines are the same. In these known arts, the lining material is commonly applied onto the inner surface of pipe lines in such a manner that SMC is inserted after peeling off the outer plastic film into a pipe line and inflated so as to be brought into contact evenly with the inner surface of the pipe line, and then SMC is cured by heating with steam or hot blast. The inner tubular film is then peeled off from the resultant FRP as shown in FIG. 10 of Ref. 2. If the inner surface of the pipe line is wetted by underground water intruded thereinto through any superannuated or damaged portion, SMC will not be completely cured in the presence of such water. As the purpose of applying the lining material to pipe lines resides originally in repairing or reinforcing such damaged or superannuated portions of the pipe lines, the above result would not achieve the inherent purpose of pipe-lining. On the other hand, SMC can be prevented from contact with water by effecting the pipe lining without peeling off the outer plastic film covering SMC. In this case, the contact of SMC with water can certainly be prevented but solvents contained in SMC remain without being evaporated which disturb the formation of a strong lining material.

In general, a mat of glass fibers impregnated with a liquid unsaturated polyester resin which is then somewhat thickened by effecting partial polymerization under heating is used as SMC. The liquid unsaturated polyester resin usually contains a large amount of styrene as reactive solvent which is partially polymerized by way of crosslinking to the polyester chain. As the amount of styrene is excess for the crosslinking to the polyester chain, such excess styrene evaporates while curing of SMC takes place and a rigid FRP is obtained. In case the outer plastic film is not removed of curing of SMC, however, the evaporation of excess styrene is inhibited so that a considerable amount of styrene remains on conversion of SMC into FRP. Accordingly, the resultant FRP becomes so soft that it may easily be scratched by nails. Such a soft FRP is not suited as the lining for pipe lines.

In case SMC is molded by pressing, such molding is generally conducted at a temperature of 130°-150° C. under pressure of 30-80 kg/cm$^2$ whereby the glass fibers can completely be impregnated with the resin and any optional filler. In case of curing SMC in Ref. 1 or 2, however, the lining material is internally pressed against the inner surface of the pipe line by pressurized fluid such as the hot blast or steam as heating source. Accordingly, the curing of SMC in this case is conducted at a mild condition involving a temperature of 60°-80° C. and a pressure of 1 kg/cm$^2$. Thus, the glass fibers cannot sufficiently be impregnated with the resin and any optional filter and the cured resin tends to form interstices through which water oozes out if the external water pressure is high.

In case a laminated film of a polyamide and polyethylene is used as inner layer in the lining material of Ref. 2, the polyethylene film which is poor in heat-resistance may be molten when heated steam is introduced as the heating medium for curing SMC. In this case, there is a fear that the steam can penetrate the polyamide film and disturb the curing of unsaturated polyester in SMC. Accordingly, polypropylene film possessing a higher heat-resistance may be used in place of polyethylene film, but polypropylene exhibits a high rate of contraction on heating and high tensile elasticity with low tear resistance, thus resulting in that the polypropylene film is shrunk by the heat of steam and is easily torn to permit permeation of steam which disturbs the curing of unsaturated polyester resin. Furthermore, in case nylon 6 is used as an outer layer of the tubular film, this nylon 6, having a relatively low melting point, may be partially molten when the temperature is maintained at about 200° C. for several minutes for the curing of unsaturated polyester resin in FRP. In this case, the molten nylon 6 can no longer be peeled off and the inner surface of the resultant FRP becomes uneven.

In general, a lining material for pipe lines is desirably provided on the inner surface thereof with an air-tight coating of a resin to impart a water-proof property to the lining material. In this case, however, heating of the lining material is often necessary for integrally combining the air-tight coating layer with the lining material. In case SMC is used in the lining material, there is a detriment such that SMC is cured by such heating prior to being applied to pipe lines.

Thus, the prior art lining materials of SMC type have, as having been discussed heretofore, a number of disadvantages to be overcome. In the above circumstances, there is a great demand for developing a new type of lining material for pipe lines in place of the conventional lining materials of SMC type having a number of drawbacks.

BRIEF SUMMARY OF THE INVENTION

Accordingly, it is an object of the present invention to provide a new type of lining material for pipe lines, especially those buried in the ground, which overcomes all of the drawbacks as seen in the known conventional lining materials of SMC type.

It is another object of the present invention to provide a specific fabric-fiber-reinforced composite molding sheet as a lining material for pipe lines, which is further provided with an outer plastic film and a specific inner tubular film.

It is still another object of the present invention to provide a new type of lining material for pipe lines which can be evenly applied onto the inner surface of the pipe lines and is capable of forming a strong fabric-fiber-reinforced plastic lining.

It is a further object of the present invention to provide a lining material for pipe lines which is applicable to the pipe lines even when wetted with water and can prevent intrusion of any external water.

It is still a further object of the present invention to provide a lining material for pipe lines which warrants the formation of a strong fabric-fiber-reinforced plastic lining on the inner surface of pipe lines and the separation of the tubular film from the lining by peeling without difficulty.

It is yet a further object of the present invention to provide a process for providing pipe lines with a fabric-fiber-reinforced plastic lining which comprises applying the above lining material onto the inner surface of pipe lines and curing the fabric-fiber-reinforced composite sheet as a main constituent of the lining material by heating.

Other objects, features and advantages of the present invention will become more fully apparent from the following description.

As a result of extensive research made for developing a new type lining material which overcomes all of the drawbacks as seen in the conventional lining material of SMC type, it has now been found surprisingly that such new type of lining material can be obtained by impregnating a sheet comprised of a fabric and a mat of fibers of high tenacity with a liquid thermohardenable resin, thickening the resin to form a fabric-fiber-reinforced composite molding sheet, and then interposing the sheet between plastic films. This specific fabric-fiber-reinforced composite molding sheet can be inserted into pipe lines and cured by heating chiefly according to a conventional method into which some new device is incorporated according to this invention. The present invention has been accomplished on the basis of the above finding.

In accordance with one embodiment of the present invention, there is provided a lining material for pipe lines which comprises a flexible tubular film, a sheet covering the outer surface of the tubular film and a film capable of being split off covering the outer surface of the sheet, characterized in that the sheet is comprised of a fabric and a mat of fibers of high tenacity impregnated with a thickened liquid thermohardenable resin to form a fabric-fiber-reinforced composite molding sheet having a sufficient length and a width greater than the inner circumferential length of a pipe line to be treated, and that both lateral end portions of the sheet are slidably overlapped with each other to form a tube around the tubular film, the outer circumferential length of the tube being shorter than the inner circumferential length of the pipe line.

In the lining material of this invention, it is preferable that the fabric is positioned in the fabric-fiber-reinforced composite molding sheet near to the outer surface. It is also preferable in the lining material that the flexible tubular film in the innermost portion can be expansively inflated by internal pressure exerted by a pressurized fluid.

In accordance with the first variant of the above embodiment, there is provided a lining material for pipe lines wherein the fabric-fiber-reinforced composite molding sheet is interposed between an inner flexible tubular film and an outer film, characterized in that the fabric is positioned adjacent to the outer surface and has a water-repellent finish.

In accordance with the second variant of the above embodiment, there is provided a lining material for pipe lines wherein the fabric-fiber-reinforced composite molding sheet is interposed between an inner tubular film and an outer film, characterized in that the inner tubular film has (a) an outer layer capable of being easily split off from the sheet and comprising a film of a biaxially oriented plastic material, (b) an intermediate layer comprising a film of a biaxially oriented plastic material and possessing flexibility, toughness and high tensile strength stress at a low degree of elongation, and (c) an inner layer possessing poor steam-permeability and resistance to heat to such a degree that the plastic material is not molten or deteriorated by steam.

In accordance with the third variant of the above embodiment, there is provided a lining material for pipe lines wherein the fabric-fiber-reinforced composite molding sheet is interposed between an inner tubular film and an outer film, characterized in that a middle film is interposed between the sheet and the inner tubular film, which is capable of being liquefied with a solvent contained in the thermohardenable resin and of being integrally bound with the sheet after curing of the thermohardenable resin.

In accordance with another embodiment of the present invention, there is provided a process for providing pipe lines with a fabric-fiber-reinforced plastic lining which comprises peeling off the outer film of the lining material, inserting the lining material into pipe lines, closing both terminal ends of the lining material, inflating the lining material by introducing a pressurized fluid whereby the overlapped slide so as to be contacted evenly with the inner surface of the pipe lines, and thereafter heating the lining material to cure the thermohardenable resin in the sheet to form an integrally combined fabric-fiber-reinforced plastic lining on the inner surface of the pipe lines.

After completion of the pipe-lining, the inner film or films are removed by drawing a turning belt previously attached to one terminal end of the lining material in the direction of the other terminal end while everting the inner film or films.

It is a characteristic feature of the present invention that a fabric-fiber-reinforced composite molding sheet (referred to hereinafter simply as "FCM-sheet") is used as the predominant constituent of the lining material. This FCM-sheet is fundamentally different in structure and technical effect from the conventional SMC as will be explained in detail hereinafter. In addition, reinforcement of pipe lines according to this invention is different from the type as described, for example, in U.S. Pat. Nos. 4,600,615, 4,686,126, etc. wherein a resin in the lining material has been cured prior to the pipe-lining treatment.

In the FCM-sheet, it is preferable that the liquid thermohardenable resin comprises an unsaturated polyester resin or an epoxy acrylate resin each having a maximum exothermic temperature according to JIS K-6901 of at least 200° C. It is also preferable that such liquid thermohardenable resin contains styrene-butadiene-styrene block copolymer, polystyrene, polyethylene, methyl polymethacrylate, polyvinyl acetate, saturated polyester, urethane-modified saturated polyester and/or polycaprolactone as a low shrinkage additive, barium sulfate, talc, aluminum hydroxide and/or glass powder as a filler, magnesium oxide and/or magnesium hydroxide as a thickening agent, and an organic peroxide having a decomposition temperature of 60°-90° C. for rendering the half-life for 10 hours as a curing catalyst.

BRIEF DESCRIPTION OF THE DRAWINGS

The present invention can more fully be understood from the following description taken in conjunction with the accompanying drawings in which.

DETAILED DESCRIPTION OF PREFERRED EMBODIMENTS

Figure 1:
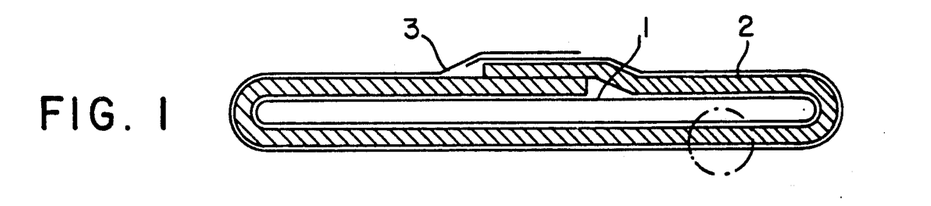
FIG. 1 is a cross sectional view of the lining material of the present invention in a flattened state.

In FIG. 1 showing an example of the lining material in flattened state, a flexible tubular film 1 is overlaid with an FCM-sheet 2. This film 1 is air-tight and elastic and is capable of being expansively inflated by internal pressure. The sheet 2 is somewhat longer in width than the film 1. Accordingly, the sheet 2 is lateral along the outer circumference of film 1 and the both side end portions thereof are slidably overlapped. The sheet 2 is overlaid with a plastic film 3 which is easily capable of being split off from the sheet 2. This film 3 is fluid-impervious so that it can inhibit evaporation of a solvent contained in the sheet 2. The film 3 is overlapped, as in the sheet 2, in its side end portions to prevent the sheet 2 from exposure to the air.

In FIG. 2 showing an enlarged cross section of the FCM-sheet 2 interposed between the films 1 and 3, a fabric 4 and a mat 5 of highly strong fiber are impregnated with a liquid thermohardenable resin 6. No limitation exists in the sort of the fabric 4. Any kind of inorganic or organic fabrics can be used but a fabric made of glass fibers or polyester can preferably be used as the fabric 4. Illustrative of the highly strong fibers constituting the mat 5 are, for example, glass fibers, carbon fibers, aramide fibers, polyester fibers and polyamide fibers. Usually, chopped strands of glass fibers are preferably used for the mat 5. No particular limitation exists in the position of the fabric 4 in the sheet 2, but the fabric is preferably in a position near the outer surface of the sheet 2 due to the reason that the fabric 4 in such a position prevents abrasion of the resin between the sheet and the inner surface of a pipe line. In this case, the fabric 4 in such a position has preferably a water-repellent finish and this water-repellency is imparted to the fabric by covering the fibers constituting the fabric 4 with a hydrophobic substance or introducing hydrophobic groups into the molecules constituting the above fibers thereby decreasing the wetness with water on the surface of the fibers. The treatment for imparting water-repellency to the fibers is carried out by the use of one or more of water-repellents of fluorine or silicone series. The water repellents of fluorine series are organic high molecular compounds having high molecules of polyacrylic esters or the like as main chain and fluorocarbon chains in side chains. In order to apply these water-repellents to the fibers, these water-repellents are dispersed in water to form an emulsion and the fibers are then dipped into the emulsion. These water-repellents display their water-repellency due to the fact that their fluorocarbon chains have poor critical surface tension. Specifically, copolymers containing esters of perfluoroalkanoic acids as a predominant component are preferable as the water-repellents of the fluorine series. On the other hand, the water-repellents of silicone series have a main chain wherein silicon atoms and oxygen atoms are arranged alternately and can be directly bound to the molecules of fibers constituting the fabric to form an extremely thin strong water-repellent film on the surface of the fibers. Specifically, methyl hydrogen siloxane is preferable as the water-repellent of the silicone series. A melamine resin or imine resin can jointly be used for improving durability.

As the thermohardenable resin are used generally an unsaturated polyester resin or expoxy acrylate resin usually used for SMC. These resins preferably have a maximum exothermic temperature of 200° C., preferably 220° C. or higher according to the high temperature curing characteristics of JIS K-6901. Any of the unsaturated polyester of ortho, iso and bis type unsaturated polyester resins having the above characteristics may be used. A urethane-modified or acrylic-modified resin can also be used as the polyester resin. As the epoxy acrylate resin is used any of the epoxy acrylate resins of bis-phenol or novolac type having the above characteristics.

The above FCM-sheet 2 can optionally contain various auxiliary substances such as a low shrinkage additive, a filler, thickening agent and/or a curing catalyst. Illustrative of the low shrinkage additives are, for example, a thermoplastic rubber such as styrene-butadiene-styrene block copolymer, and a thermoplastic polymer such as polystyrene, polyethylene, methyl polymethacrylate, polyvinyl acetate, a saturated polyester, a urethane-modified saturated polyester and/or polycaprolactone. The proportion of the low shrinkage additive to the thermohardenable resin is desirably as follows: the thermohardenable resin/the low shrinkage additive =50–90/50–10. Illustrative of the filler are, for example, inorganic substances having chemicals-resistance, especially acid-resistance such as barium sulfate, talc, alumina, aluminum hydroxide and/or glass powder. The filler is used in an amount of 15–200 parts by weight based on 100 parts by weight the total amount of the thermohardenable resin and the low shrinkage additive. Illustrative of the thickening agent are, for example, magnesium oxide and/or magnesium hydroxide. The thickening agent is desirably used in an amount of 0.5–5.0 parts by weight based on 100 parts by weight of the total amount of the thermohardenable resin and the low shrinkage additive. As the curing catalyst is used an organic peroxide having a decomposition temperature of 60°–90° C., preferably about 70° C. for obtaining a half-life of 10 hours. Illustrative of the curing catalyst are, for example, cumyl peroxyneodecanoate, tert-butyl peroxyoctoate, tert-butyl peroxyisobutyrate, 1,1-bis(-tert-butyl peroxy)3,3,5-trimethylcyclohexane, benzoyl peroxide and succinic peracid. An organic peroxide having a decomposition temperature higher than 90° C. for obtaining the half-life of 10 hours is slow in reaction velocity so that the curing time becomes longer. On the other hand, an organic peroxide having a decomposition temperature lower than 60° C. causes premature gellation of the resin so that the operation for impregnating the fabric 4 and the mat 5 with the resin 6 becomes extremely difficult. The curing catalyst is desirably used in an amount of 0.5–4.0 parts by weight based on 100 parts by weight of the total amount of the thermohardenable resin and the low shrinkage additive.

In addition to the above auxiliary substances, a colorant such as dye or pigment and other additive such as a stabilizer, etc. may be incorporated into the resin 6.

Finally, the mat is used desirably in an amount of 15–150 parts by weight based on 100 parts by weight of the total amount of the thermohardenable resin and the low shrinkage additive.

Specifically, the inner tubular film 1 is desirably made of a polyester of synthetic resin having heat-resistant and strong characteristics and is moderately expansive or stretchable by internal pressure. The tubular film 1 has preferably at least a two-layer structure wherein the inner surface is a layer of polyolefin, preferably polypropylene having poor water vapor permeability and the outer surface is a layer of polyester. Most preferable as the tubular film, 1 is a three-layered film as will be described in detail hereinafter. Specifically, the outer plastic film 3 is desirably made of a polyester as in the case of the tubular film 1.

The FCM-sheet 2 can be manufactured first mixing the thermohardenable resin 6 with one or more of the optional ingredients such as low shrinkage additives, fillers, thickening agents curing catalysts and/or colorants to form a composite substance and then impregnating a combination of the fabric 4 and the mat 5 of highly strong fibers. More precisely, the plastic film 3 is overlaid with the fabric 4 such as a glass cloth and the liquid thermohardenable resin 6 in a given amount is applied onto the surface of the fabric 4. The highly strong fibers such as glass fibers are then dispersed on the surface of the resin 6 while cutting the fibers by a cutter, thereby forming a mat 5 on the surface of the resin 6. On the other hand, the thermohardenable resin 6 is applied onto a separate plastic film and the resin-coated film is placed on the mat 5 in such manner that the surface of the film on which the resin 6 has been coated by contact with the mat 5 and a mixture of the fabric 4, the mat 5 and the resin 6 interposed between the film 3 and another plastic film is pressed externally to impregnate a combination of the fabric 4 and the mat 5 sufficiently with the resin 6. The sheet thus obtained is then heated at a predetermined temperature, e.g. at 40° C. to partially cure the resin 6 whereby it is somewhat thickened. The viscosity of the resin 6 after thickening is preferably 10000-100000 poise as composite substance. If the viscosity is too low, it will become difficult to peel off the plastic film, thus making workability inferior. On the other hand, if the viscosity is excessively high, the resultant lining material will deteriorate in adhesion to the inner surface of a pipe line, thus making it impossible to provide the pipe line adequately with the lining. The thickened FCM-sheet 2 thus obtained is cooled and stored at a temperature lower than 20° C. whereby the thickening effect is reduced and the FCM-sheet 2 can be stored for a long period of time.

The lining material of this invention wherein the FCM-sheet 2 is interposed, for example, between the films 1 and 3 can be manufactured from the FCM-sheet 2 in the following manner: The FCM-sheet 2 is placed on a board in such manner that the film 3 faces the board, and the plastic film on the opposite side is peeled off. The tubular film 1 is then placed on the exposed sheet 2 at the central part thereof, and both end portions of the sheet 2 are laminated on the tubular film 1 in such manner that both side edge portions are slidably overlapped with each other to cover the film 1 entirely with the sheet 2. The sheet 2 shaped as a whole in the form of a tube, though its edge portions are overlapped with each other, is then overlaid with the plastic film 3 both edges of which are overlapped with each other as in the case of the sheet 2, thereby forming the lining material having the cross section as shown in FIG. 1.

Figure 3:
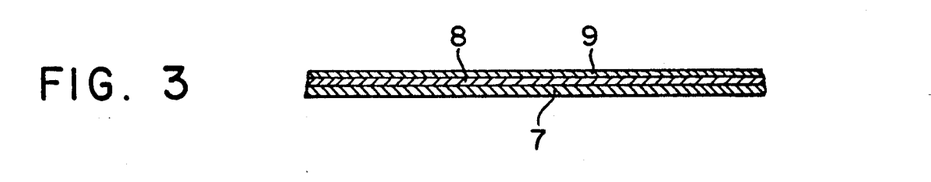
FIG. 3 is a cross section of an example of the inner tubular film having three layers.

In FIG. 3 showing the cross section of an inner tubular film 1 having three layers, the film comprises an outer layer 7, an intermediate layer 8 and an inner layer 9. The outer layer 7 comprises a biaxially oriented film of a plastic which is easily peeled off from the FCM-sheet 2 and is excellent in tensile strength and heat-resistance. Specifically, polyethylene terephthalate or nylon 66 is suited for the plastic constituting the outer layer. Such plastic has a melting point above 250° C. and is not deteriorated even by the heat evolved during the curing reaction of the thermohardenable resin. Thus, the inner tubular film 1 can be peeled off from the inner surface of the FCM-sheet 2 after it is cured. As the tensile strength of the outer layer 7 is excellent, it withstands the tensile force for peeling off the tubular film 1 from the sheet 2 after its curing.

The intermediate layer 8 comprises a biaxially oriented film of a plastic which possesses flexibility, toughness and high tensile stress at a low degree of elongation. Nylon 6 is suitable as the plastic. Polyethylene terephthalate or nylon 66 is excellent in strength but is inferior in a flexibility and toughness. When the lining material is folded in flattened state, the inner tubular film 1 is especially strongly folded so that the so-called "blushing" takes place in the folded edge portions and pinholes may be formed in extreme cases. Accordingly, the intermediate layer 8 is provided inside the outer layer 7 to maintain flexibility of the inner tubular film 1 and at the same time to prevent the formation of pinholes thereby preventing intrusion of water vapor.

The inner layer 9 comprises a non-oriented film of a plastic which possesses poor water-permeability and resistance to heat to such a degree that the plastic is not molten or deteriorates by steam. Polypropylene is suitable as the plastic but should not be oriented. Polypropylene has poor water vapor transmission and a melting point of 130°-140° C. so that it withstands steam. However, polypropylene cannot withstand the heat (about 200° C.) during the curing of the sheet 2 but the inner layer is positioned furthermost to the sheet 2 and is contacted with steam of a lower temperature. Accordingly, polypropylene is not heated above its melting point and covers the inner surface of the tubular film 1 to prevent transmission of water vapor. In case the inner layer 9 is used under such condition that it may be exposed to high temperatures, it is preferable to use a block copolymeric polypropylene having a high melting point. In general, oriented polypropylene has high tensile elasticity and contraction by heat but is poor in tear resistance. Accordingly, the use of oriented polypropylene causes contraction by heat of heated steam and partial crack in the extreme case so that the intermediate layer and the outer layer can be contacted directly with heated steam. As the film of this invention is not oriented, however, there is no fear of contraction even by heating. Further, the film is extremely low in tensile elasticity but is high in tear resistance. Accordingly, the film is not cracked by heating and ensures inhibiting the transmission of steam.

The inner tubular film 1 of this invention is manufactured by integrally binding each plastic film of the outer layer 7, the intermediate layer 8 and the inner layer 9 by the aid of a binder of isocyanate series as dry laminate, making the integrally combined film tubular, and heat-sealing the inner layer 9 at both side ends. Alternatively, the inner film 1 may be manufactured by bringing both side ends of the integrally combined film into contact with each other and heat-sealing the film with a fraction of a tape having the same structure as of the inner tubular film 1 in such manner that the layer corresponding to the inner layer 9 of the tape may be faced to the inner layer 9 of the film 1.

In FIG. 4 showing a partial enlarged view of another example of the lining material, the FCM-sheet 2 is interposed, as in the example of FIG. 1, between the inner tubular film 1 made of a heat-resistant synthetic resin and the outer film 3. In this example, however, a liquefiable film 9A, i.e. polystyrene film 9A as a third film is further interposed between the FCM-sheet 2 and the tubular film 1. This polystyrene film 9A can be provided around the film 1 by covering the tubular film 1 with a polystyrene tube or winding a polystyrene film spirally on the tubular film 1. These films 1 and 9A are then overlaid with the FCM-sheet 2 and the outer film 3 in the same manner as shown in FIG. 1.

The thermohardenable resin 6 contains monomeric styrene as a reactive solvent. The polystyrene film 9A as a liquefiable film is dissolved in this monomeric styrene and as a whole forms a This solution is kept between the inner tubular film 1 and the FCM-sheet 2. In this case, the fabric 4 and the mat 5 of highly strong fibers may be the same as described with respect to FIG. 1. The monomeric styrene participates in the reaction as a cross linking agent on the curing of the unsaturated polyester resin 6 and is entirely consumed at the stage the curing of the unsaturated polyester resin 6 has been finished.

As another example of the liquefiable film 9A is used a film of ethylene vinyl acetate copolymer (EVA). In this case, EVA film 9A is molten by the heat evolved by the curing of an unsaturated polyester resin 6 in the FCM-sheet 2, and the molten EVA film 9A is again solidified, after completion of the curing reaction of the unsaturated polyester resin 6, by cooling to form an integrally combined fabric-fiber-reinforced plastic lining.

The process of this invention for providing pipe lines with a fabric-fiber-reinforced plastic lining will now be explained in detail with reference to the drawings.

At the outset, the outer film 3 for the purpose of sealing the FCM-sheet 2 to inhibit evaporation of liquids, e.g. the thickened liquid unsaturated resin 6 and styrene, is removed by peeling it off from the lining material prior to using it for pipe lining. The lining material is then inserted into a pipe line preferably in such manner that at one terminal end of the pipe line a lining material is connected at its one end to a drawing belt 10 previously passed through the pipe line from the other terminal end.

FIG. 5 is a plan view showing the lining material and the drawing belt in this state. The drawing belt 10 forms an expanded portion 11 at its front end. The lining material 12 in a flattened state is overlaid at its one end with the end portion of the drawing belt 10 and folded to wrap the expanded portion 11 therewith as shown in FIG. 5. The lining material 12 is fastened externally with a rope 13 together with the drawing belt 10. The lining material 12 can thus be connected in such manner to the drawing belt 10 and the expanded portion ensures this connection. Accordingly, the drawing force of the belt 10 can be exerted evenly to the lining material 12.

When the lining material 12 in the flattened state is drawn into the pipe line by the action of the drawing belt 10, the lining material 12 is preferably pushed down in its central part at the entrance of the pipe line so as to form "U" shape in cross section.

Figure 6:
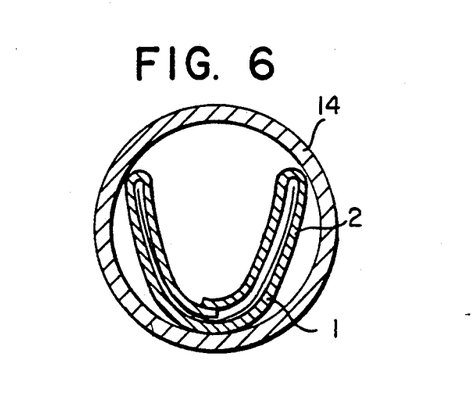
FIG. 6 is a cross sectional view showing the state of the lining material inserted into a pipe line.

FIG. 6 is a cross sectional view of the pipe line through which the lining material is introduced in "U" shape in cross section while being kept in the flattened state. In FIG. 6, the lining material consists of the FCM-sheet 2 and the inner tubular film 1 in this example (the outer film 3 has been peeled off) is inserted in the flattened state but in the bent state in "U" shape into the pipe line 14. The lining material has an outer peripheral length slightly shorter than the inner peripheral length of the pipe line 14. Accordingly, the lining material in flattened state has a width significantly larger than the inner diameter of the pipe line 14. If the lining material is inserted in a flattened state into the pipe line and pulled forward by the action of the drawing belt, both side edges of the flattened lining material will strongly be pressed against the inner surface of the pipe line 14 so that both side edge portions can be damaged by friction and abrasion. Accordingly, the lining material is bent in the lateral direction so as to form "U" shape in cross section, whereby the friction between the moving lining material and the inner surface of the pipe line becomes minimum and the lining material is pulled forward smoothly while making the shape of the lining material in cross section in compliance with the curvature of the inner surface of the pipe line 14.

When the lining material has been fully inserted into the pipe line, both ends of the lining material are allowed to extend from both ends of the pipe line. Both ends of the lining material are then provided with a proper sealing tool so that one end of the lining material is closed and a pressurized fluid is introduced into the lining material through the sealing tool on the other side to inflate the lining material.

Figure 7:
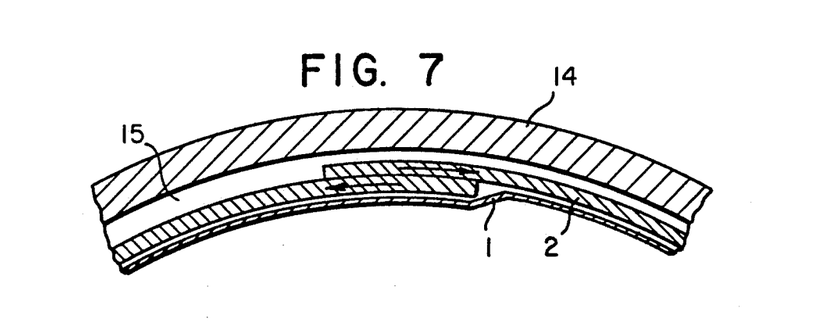
FIG. 7 is a partial cross sectional view showing the state of the lining material merely internally inflated.

FIG. 7 is a partial cross sectional view showing the state of the lining material in the pipe line internally inflated at the initial stage, i.e. the state of the lining material ordinarily inflated by a pressurized fluid as described above. As the pressurizing fluid for inflating the lining material, compressed air or pressurized water is used, but the use of compressed air is preferable. In FIG. 7, a clearance 15 is formed between the pipe line 14 and the FCM-sheet 2. This is due to the reason that the outer peripheral length of the inner tubular film 1 is originally so selected that it is somewhat shorter than the inner peripheral length of the pipe line 14.

By elevating the inner pressure in the lining material, the inner tubular film 1 is expanded and the FCM-sheet 2 is slidably moved at the overlapped portion in such manner that both ends of the sheet 2 are moved in opposite directions as shown by the arrow marks in FIG. 7 to increase the peripheral length of the sheet 2.

In case compressed air is used for inflating the lining material, its pressure is normally within the range from 0.3 to 1.0 kg/cm$^2$G. In case the lining material is merely inflated, a pressure of about 0.3–0.5 kg/cm$^2$G is necessary. On the other hand, a somewhat stronger pressure, e.g. 0.5–1 kg/cm$^2$G is necessary for expanding the lining material to bring it into tight contact with the inner surface of the pipe line.

Figure 8:
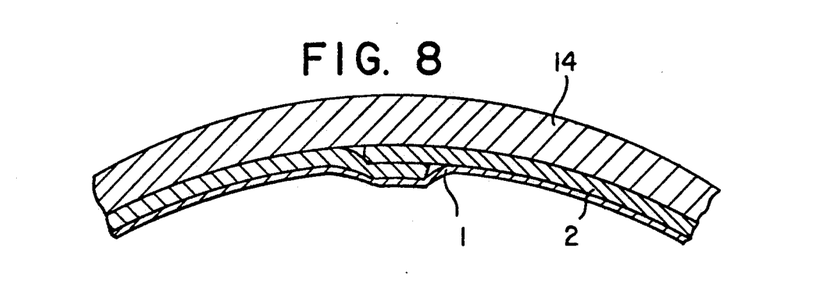
FIG. 8 is a partial cross sectional view showing the state of the lining material brought into tight contact with the inner surface of a pipe line.

FIG. 8 is a partial cross sectional view showing the state of the lining material at the final stage in the pipe line where the lining material is tightly contacted with the inner surface of the pipe line. The above 2-stage pressurizing treatment for realizing the state as shown in FIGS. 7 and 8 can be carried out continuously. After the pressurizing treatment, it is then confirmed whether or not the lining material is tightly contacted over its full length with the inner surface of the pipe line. Next, the pressurized fluid is evacuated and then a fluid for heating the lining material internally is introduced into the pipe line. Usually, steam is used as the fluid for heating the lining material. The steam pressure in this case is usually within the range of 0.3–1.0 kg/cm$^2$G and the heating is continued until the thermohardenable resin 6 in the FCM-sheet 2 is completely cured. In case the FCM-sheet 2 contains styrene or EVA, this substance is also cured integrally with the thermohardenable resin. The time necessary for curing the resin is generally within the range from 30 minutes to 2 hours, preferably one hour.

After completion of the curing, steam is replaced with compressed air to cool the lining material. By heating, the thermohardenable resin in the FCM-sheet is cured integrally with the fabric and the mat of highly strong fibers to form a fabric-fiber-reinforced plastic lining which is strongly bonded as a rigid pipe to the inner surface of the pipe line. Finally, the inner tubular film 1 is removed by peeling it off from the resultant fabric-fiber-reinforced plastic lining as a rigid pipe. In this case, the peeling of the tubular film 1 is preferably carried out by pulling a leader belt previously passed through the inside of the pipe line and connected to one end of the tubular film 1 while everting it.

According to the present invention, a number of advantages can be achieved by using the specific FCM-sheet and the specific pipe-lining process.

The FCM-sheet used in the present invention comprises the fabric and the mat of highly strong fibers impregnated with the thermohardenable resin is different in strength from SMC comprising only a mat of similar strong fibers impregnated with a thermohardenable resin. In case of SMC, the lining material is locally stretched or broken in the extreme case. In case of the FCM sheet, the lining material is so strong that it has a high tensile strength and is quite free of local elongation or break even at the time of being drawn into a pipe line. In addition, the FCM-sheet withstands local elongation and forms no wrinkles on sliding of the overlapped portions for increasing the peripheral length of the FCM-sheet, i.e. the diameter of the FCM-sheet. Thus, an adequate lining of the FCM-sheet under proper tension can be made over the entire inner surface of the pipe line. As the overlapped portions of the FCM-sheet is tacky but slidably movable in opposite directions to increase its peripheral length under a relatively low inner pressure without causing any mutual fusion, the lining operation can easily be carried out over the full length of the pipe line without causing any trouble.

In case of the FCM-sheet having the water-repellent fabric, it prevents external intrusion of moisture or water into the liquid thermohardenable resin so that the curing reaction of the FCM-sheet is not disturbed. As the water repellent fabric inhibits intrusion of external water even after the curing reaction, intrusion of water into the pipe line can be prevented even if the structure of the FCM-sheet is not sufficiently dense. It is a matter of course that the lining treatment can be made even if the pipe line is wetted.

In case of the lining material having three layers as the inner tubular film, the following technical merits can be achieved. As a film of high strength is used for the outer layer and an intermediate layer exists inside of the outer layer, the inner tubular film has high mechanical strength and moderate flexibility and so is convenient in handling. Even if the so-called "blushing" phenomenon of the outer layer takes place in case of folding the lining material in a flattened state, the existence of the intermediate layer possessing flexibility, toughness and high tensile strength at a low degree of elongation prevents the formation of pinholes which would permit intrusion of water vapor into the FCM-sheet and induce bad influence on the lining material. In a case where a pipe line to be treated has a branched portion, a troublesome problem occurs in the lining treatment. When steam is introduced into the lining material applied to the inner surface of the pipe line, the inner tubular film is expanded under the steam pressure to allow the FCM-sheet to expand into the recession of the branched portion. In this invention, however, a film of high strength is used as the outer layer and biaxially oriented films are used for both outer and intermediate layers so that the inner layer is not excessively expanded and the FCM-sheet is prevented from local reduction in thickness. When the lining material is heated with steam, the inner layer prevents permeation of steam while the outer layer withstands the heat (about 200° C.) of the exothermic reaction during the curing of the thermohardenable resin. The inner layer is not so high in heat-resistance but is not excessively heated as it is contacted with steam. After completion of the curing reaction, the inner tubular film is removed by peeling it off from the resultant fabric-fiber-reinforced plastic lining while everting the film by drawing it with a drawing belt. The heavy load in this case is undertaken by the film of the outer layer which has been biaxially oriented and has strong tensile strength. Further, the outer layer has high heat-resistance and is not molten at the time of curing the thermohardenable resin so that the inner tubular film having the outer layer in contact with the resultant fabric-fiber-reinforced plastic lining can easily be peeled off therefrom. Accordingly, the lining of a pipe line with the fabric-fiber-reinforced plastic lining can be attained without any trouble by the use of the inner tubular film having three layers.

In case of the lining material as shown in FIG. 4, the liquefiable film is dissolved in a polymerizable solvent but is solidified to form an integral plastic lining with the FCM-sheet. In case the inner pressure at the time of curing the FCM-sheet is insufficient, a dense fabric-fiber-reinforced plastic lining cannot be obtained and a number of interstices are formed in the fabric and/or mat structure. Even if that is the case, the liquefied resin occupies the interstices and solidifies integrally with the cured resin in the sheet. Thus, the bonding strength of the fabric-fiber-reinforced plastic lining to the inner surface of the pipe line is significantly enhanced.

In the liquid thermohardenable resin contained in the FCM-sheet, a thermoplastic polymer as a low shrinkage additive is dispersed in the form of fine particles. When a rapid exothermic reaction takes place on the curing of the thermohardenable resin, the thermoplastic polymer particles undergo rapid thermal expansion by the heat to compensate shrinkage of the thermohardenable resin accompanied by the curing reaction. When the curing of the thermohardenable resin is finished, the exothermic phenomenon is ceased and the temperature is depressed whereby the thermoplastic polymer particles are contracted. At that time, however, the thermohardenable resin has been cured and forms three dimensional linkages so that it can no longer be shrunk. Accordingly, the thermoplastic polymer alone is contracted while forming voids inside, and thus a lining free of contraction as a whole can be formed. Accordingly, the lining material of this invention is not contracted on curing and is firmly bonded to the inner surface of the pipe line without being peeled off.

As the filler, the use of an acid-resistant substance such as barium sulfate, talc, glass powder and the like is effective for making the lining material anti-corrosive. Aluminum hydroxide, magnesium hydroxide and the like are themselves weak in acid-resistance but can preferably be used in the present invention.

What is claimed is:

1. A lining material for pipe lines which comprises a flexible tubular film, a sheet covering the outer surface of the tubular film and a film capable of being split off covering the outer surface of the sheet, characterized in that the sheet is comprised of a fabric and a mat of fibers of high tenacity impregnated with a thickened liquid thermohardenable resin to form a fabric-fiber-reinforced composite molding sheet having a sufficient length and a width greater than the inner circumferential length of a pipe line to be treated, and that both laterally end portions of the sheet are slidably overlapped with each other to form a tube around the tubular film, the outer circumferential length of the tube being shorter than the inner circumferential length of the pipe line.

2. A lining material according to claim 1, wherein the fabric is positioned in the fabric-fiber-reinforced composite molding sheet near to the outer surface.

3. A lining material according to claim 2, wherein the fabric has a water-repellent finish.

4. A lining material according to claim 1, wherein the fabric-fiber-reinforced composite molding sheet is interposed between an inner tubular film and an outer film, characterized in that the inner tubular film has (a) an outer layer capable of being easily split off from the sheet and comprising a film of a biaxially oriented plastic material, (b) an intermediate layer comprising a film of a biaxially oriented plastic material and possessing flexibility, toughness and high tensile stress at a low degree of elongation, and (c) an inner layer possessing poor steam-permeability and resistance to heat to such a degree that the plastic material is not molten or deteriorated by steam.

5. A lining material according to claim 1, wherein the fabric-fiber-reinforced composite molding sheet is interposed between an inner tubular film and an outer film, characterized in that a middle film is interposed between the sheet and the inner tubular film, which is capable of being liquefied with a solvent contained in the thermohardenable resin and of being integrally bound with the sheet after curing of the thermohardenable resin.

* * * * *

UNITED STATES PATENT AND TRADEMARK OFFICE
CERTIFICATE OF CORRECTION

PATENT NO. : 5,186,987
DATED : February 16, 1993
INVENTOR(S) : Takayoshi Imoto et al It is certified that error appears in the above-identified patent and that said Letters Patent is hereby corrected as shown below:

Title page,
item 30, Foreign Application Priority Data,

Change "2-95881" to --2-95880--.

Signed and Sealed this

Eleventh Day of January, 1994

Attest:

BRUCE LEHMAN

Attesting Officer          Commissioner of Patents and Trademarks